J. E. BOOGE.
METHOD OF REMOVING OR DECREASING OBJECTIONABLE ODORS FROM TREATED OILS.
APPLICATION FILED JUNE 13, 1918.
1,357,836. Patented Nov. 2, 1920.
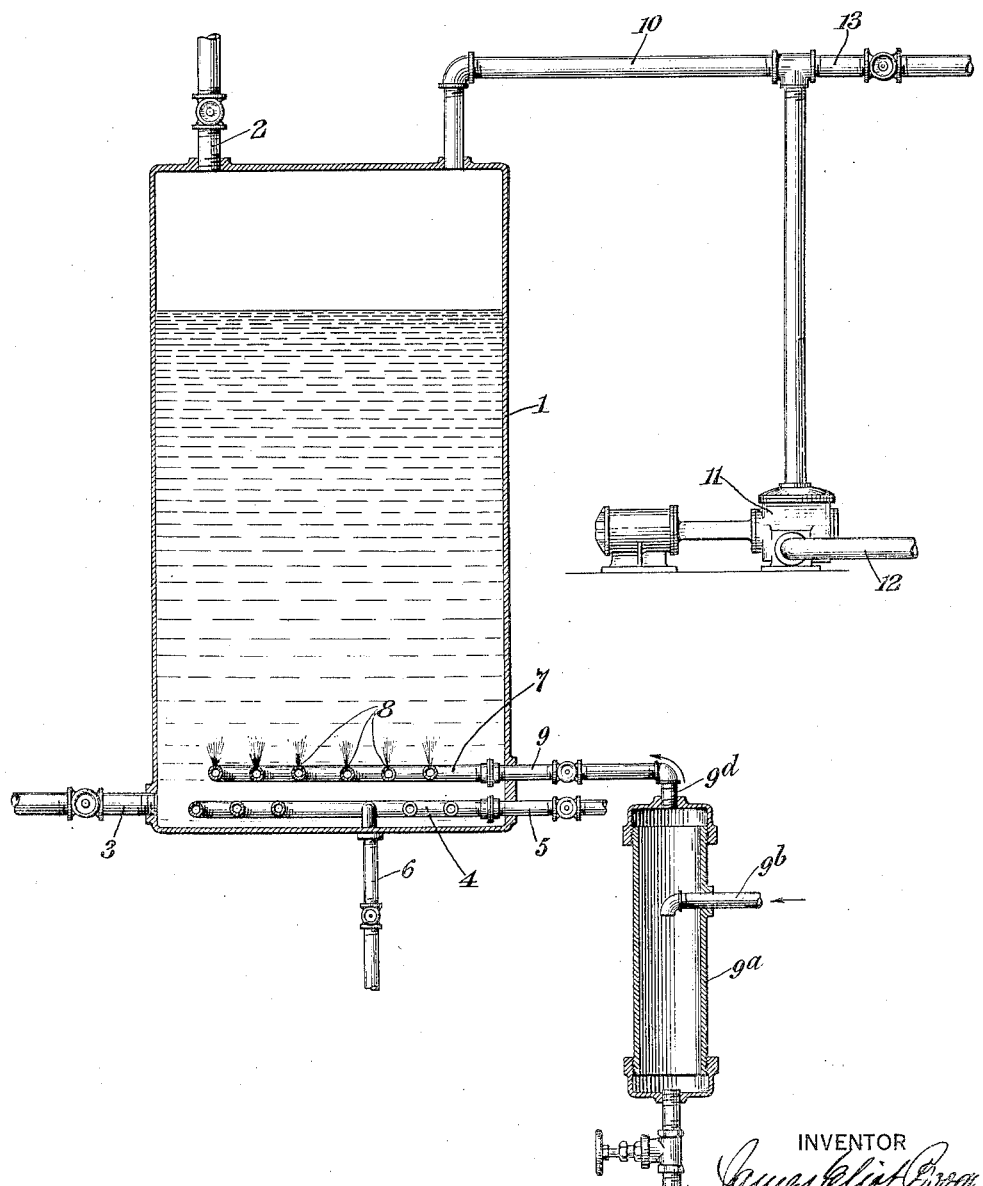
INVENTOR
BY
ATTORNEY

UNITED STATES PATENT OFFICE.

JAMES ELIOT BOOGE, OF WILMINGTON, DELAWARE, ASSIGNOR TO E. I. DU PONT DE NEMOURS & COMPANY, OF WILMINGTON, DELAWARE, A CORPORATION OF DELAWARE.

METHOD OF REMOVING OR DECREASING OBJECTIONABLE ODORS FROM TREATED OILS.

1,357,836.  Specification of Letters Patent.  Patented Nov. 2, 1920.

Application filed June 13, 1918. Serial No. 239,902.

*To all whom it may concern:*

Be it known that I, JAMES ELIOT BOOGE, of Wilmington, in the county of New Castle, and in the State of Delaware, have invented a certain new and useful Improvement in Methods of Removing or Decreasing Objectionable Odors from Treated Oils, and do hereby declare that the following is a full, clear, and exact description thereof.

My invention relates particularly to a process for removing or decreasing the odors of partly oxidized oils, and has application to vegetable or animal oils that have been treated, and which contain such objectionable odors.

The object of my invention is to provide a process by means of which vegetable or animal oils which have been previously treated by blowing, oxidation or polymerization, and which contain objectionable odors, may be changed into oils substantially freed from such odors.

Another object of my invention is to subject partly oxidized oils to said process in such a way as to avoid foaming, due to the presence of water in the liquid state in the injected steam, which is introduced in the process.

A further object is to subject vegetable or animal oils of this character to a process in which dry steam may be introduced at an elevated temperature at atmospheric or less than atmospheric pressure in order to obtain the result referred to.

Further objects of my invention will appear from the detailed description thereof contained hereinafter.

While my invention is capable of being carried out in many different ways, I shall describe only certain ways of carrying out the same hereinafter, and while it is capable of being carried out in connection with many different types of apparatus, I shall describe only one type of apparatus for use in carrying out the same in the accompanying drawings, in which:

In the drawings I have shown a diagrammatic view of an apparatus which may be used in accordance with my invention.

In the drawings I have shown a tank 1 having a valved inlet pipe 2 for oil, and a valved outlet pipe 3 for the oil after having been subjected to my process. At the bottom of the tank 1 there is a steam heating coil 4 having a valved steam inlet pipe 5 and a valved steam outlet pipe 6. Near the bottom of the tank 1 there is furthermore a perforated coil 7 having perforations 8 in the upper portion of the same to inject a current of dry steam into the oil, said coil 7 being supplied by means of a valved pipe 9 with said steam, which is dried by being passed through a steam separator $9^a$ having a steam inlet pipe $9^b$, a valved outlet pipe for water $9^c$, and an outlet pipe $9^d$ for the dry steam. From the top of the tank 1 a vapor outlet pipe 10 leads to a vacuum pump 11 which has a pipe 12 leading to the outer air. Said pipe 10 furthermore has a valved branch pipe 13 which may be used when it is not desired to use the vacuum pump 11.

In carrying out my process a quantity of a partly oxidized oil which may be any vegetable or animal oil, and which has been previously treated by blowing at an elevated temperature or by oxidation with air or oxygen in some manner other than blowing, as by exposure to the air of a fabric saturated with the oil or by polymerization through the application of heat, and which oil may for example be cottonseed oil, which after the treatment has through rancidity or otherwise acquired objectionable odors, is introduced into the tank 1 through the pipe 2. Such objectionable odors in the oils referred to often develop during the treatment to which they have been subjected, and such oils furthermore have a marked tendency to grow rancid when exposed to the air or light either alone or when mixed with other materials. By the treatment to which I now subject these oils the initial objectionable odor as well as the odors which have been acquired through rancidity are greatly reduced or entirely removed. In order to accomplish this end the oil in the tank 1 is heated to a temperature of 120° C., by means of the steam coil 4. Dry steam is then blown into the oil from the coil 7 for approximately six hours, the temperature being maintained between 110° and 130° C. During the treatment the vacuum pump 11 may or may not be used as desired, but if it is used so as to obtain a vacuum of 25 in. of mercury, a somewhat lower temperature may be utilized in the tank 1, that is to say 105° C. The oil which has been subjected to this treatment will be found to have been substantially freed from the objectionable odors which are due in part to the presence of odorous volatile constituents, and if any odor is present only a faint oily odor will remain. The action of the injected steam is to reduce the partial pressure of the vapors of the volatile constituents by dilution with a gas which is continually replaced, thus promoting evaporation. The utilization of the separator 9ª insures the injection of dry steam so that in this way any foaming of the oils during the treatment is avoided. It will be understood, however, that instead of obtaining the dry steam by using the separator 9ª, I may use superheated steam. By utilizing a dry inert gas such as dry steam further oxidation of the oil with resulting rancidity is avoided.

It will be understood also that many other oils may be used as for example blown soya bean oil.

While I have described my invention above in detail, I wish it to be understood that many changes may be made therein without departing from the spirit thereof.

However, by the term "partly oxidized oils" which I have used herein, I wish it to be understood that I mean only those vegetable or animal oils which have been blown, oxidized or polymerized.

I claim:

1. The process which comprises subjecting a partly oxidized vegetable or animal oil containing objectionable odors to blowing with a dry inert gas at a temperature of from about 105° to 130° C. to decrease said odors thereof.

2. The process which comprises subjecting a partly oxidized vegetable oil containing objectionable odors to a dry inert gas at a temperature of from about 105° to 130° C. under decreased pressure to decrease said odors thereof.

3. The process which comprises subjecting a partly oxidized cotton seed oil containing objectional odors to dry steam at a temperature of from 110 to 130° C. for about 6 hours to decrease said odors thereof.

In testimony that I claim the foregoing I have hereunto set my hand.

JAMES ELIOT BOOGE.

Witnesses:
G. D. HOPKINS,
STANLEY L. ABRAMS.